April 21, 1936.   W. F. SMITH   2,038,009
BALL BEARING
Filed Aug. 29, 1934
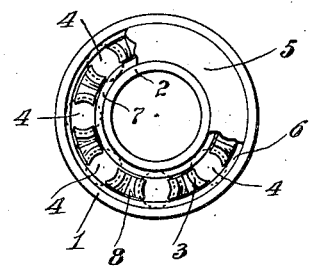
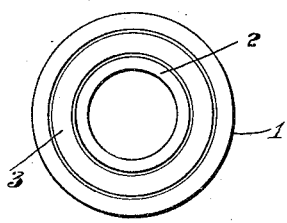
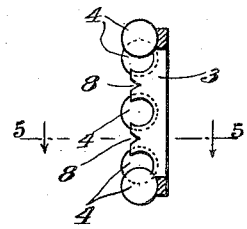
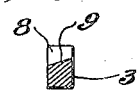
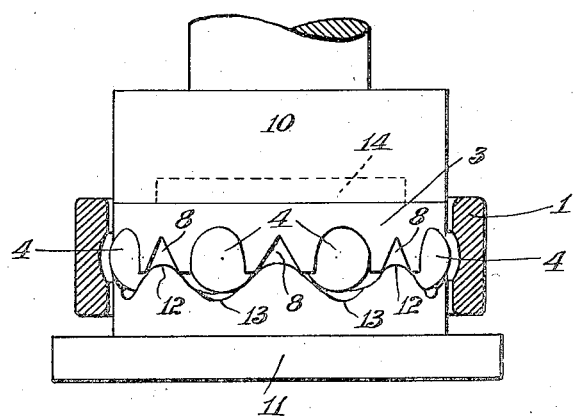
INVENTOR
W. F. Smith
BY
ATTORNEY Patented Apr. 21, 1936

2,038,009

UNITED STATES PATENT OFFICE 2,038,009

BALL BEARING

William F. Smith, Poughkeepsie, N. Y., assignor to The Federal Bearings Co., Inc., Poughkeepsie, N. Y., a corporation of New York Application August 29, 1934, Serial No. 741,880

2 Claims. (Cl. 308—201)

This invention relates to new and useful improvements in ball bearings and more particularly to ball bearing retainers and methods of forming them.

In many locations the proper lubrication of bearings is difficult or impossible. For instance, the pilot bearing supporting the front end of the drive shaft in automobile transmissions is usually located in a counter-bore of the flywheel and is therefore inaccessible for lubrication.

Various arrangements have heretofore been adopted to provide for the lubrication of such inaccessible bearings. Ball bearings are usually packed with grease during the assembly, the grease being retained in the bearings by means of felt seals or the like. Such ball bearings, however, are relatively expensive, the life of the lubricant is limited and the lubricant cannot be readily replenished.

In order to overcome these disadvantages of grease-packed ball bearings, the bearing surface is often made of various compositions of self-lubricating material. These materials usually contain some lubricant such as oil which at certain temperatures is forced to the surface of the material and provides a lubricating film. One of the commercially successful compositions consists of powdered copper, zinc and graphite which are thoroughly mixed and molded in dies. The molded material is heat-treated to render the mass more homogeneous and to improve its physical properties, and is then etched with acid to open the surface pores. The acid is neutralized by washing in gasoline and other solutions, whereupon the material is immersed in oil at a temperature of approximately 230° F. for a period of thirty minutes. After such immersion the material is found to retain approximately one-third of its volume of oil. When the bearing heats up, the oil is forced to the surface and forms, in conjunction with the graphite, a film of lubricant. Upon cooling, the lubricant is again reabsorbed by capillary action.

When the retainer of a ball bearing is made of such material the film of lubricant forms at the retainer where the maximum rubbing velocities exist. The balls transfer this film to the races and it has been found that without the use of any supplimentary seals to prevent the escape of lubricant and without the addition of any grease or other lubricant to the ball bearings, such retainers will supply sufficient lubricant for the life of the bearing.

However, the difficulties encountered in the use of such self-oiling materials in ball bearing retainers were so great that in many instances ball bearings were abandoned and the self-oiling material merely used as a sleeve bearing.

One cause of these difficulties is the poorness of the physical properties of such self-oiling materials. The compressive strength is only about 60% of that of cast bronze and its ductility is so low that bending and forming operations can be carried out only within narrow limits.

Another difficulty constituting probably the greatest stumbling block is that the structure and composition of the metal in combination with the graphite produces a highly abrasive action which will dull quickly the cutting edges of even the highest grades of cutting steels. This abrasive action is so pronounced as to make it commercially impracticable to carry out extensive machine operations.

The relatively poor physical properties of the materials and the requirements of the manufacturing process make it necessary that heavy sections be used as compared with that of the ordinary steel retainer. The minimum thickness required in the molding of this material is such that, due to the high specific gravity, a comparatively heavy structure is produced when the material is formed into a retainer. This excessive weight is objectionable in the usual type of retainer, since the pocket clearance for the balls must be great enough to avoid friction. Owing to this clearance the retainer will take up during rotation an off-center position and the decentralized mass of the retainer creates an unbalanced force. This in turn is reflected by excessive friction between the balls and retainer in the off-center position.

In accordance with the present invention the ball retainer is of the above described material of the self-oiling type. The difficulties have been overcome by centering the retainer on the cone or inner raceway of the bearing rather than on the balls, whereby the amount of decentralization is reduced to a minimum and the balls are relieved of any supplementary load. In order to avoid all machining operations the retainer is preformed, preferably by a molding operation, to the required dimensions and impregnated with oil ready for assembly in the finished bearing. As molded, the retainer contains pockets for the balls and the material between the pockets is formed by a closing die to a radius conforming to that of the radius of the ball pockets. The quantity of material used in the retainer is reduced to a minimum so as to reduce the weight and cost.

These and other features of the invention will more clearly appear from the following detailed description of one embodiment thereof and the appended claims.

In the drawing, Fig. 1 is a top plan view of a fully assembled ball bearing with part of the dust protector broken away to display the retainer with the balls;

Fig. 2 is a bottom plan view of the bearing;

Fig. 3 is a side elevation of one-half of the retainer ring with the balls in place;

Fig. 4 is a side elevation of a section of the retainer showing a groove formed between pockets;

Fig. 5 is a sectional view along lines 5—5 of Fig. 3; and

Fig. 6 is a side elevation of the closing die.

The ball bearing consists of an outer race 1 and an inner race or cone 2 between which rotates freely a retainer 3 carrying the balls 4. The thickness of the retainer is substantially the same as the space between the races, allowing a running fit on the cone and clearance between the retainer and outer ring. A dust shield 5 may be sprung in place in the usual manner in a groove provided in the outer race 1 above a shoulder 6 formed in said race, the shield closely fitting but not in contact with a shoulder 7 formed in the cone 2.

For the sake of illustrating an embodiment of the invention I have shown in the drawing a ball bearing having an outside diameter of 1.574". The external diameter of the retainer 3 is 1.300", the internal diameter .968", and the height of the retainer is .275". In molding the retainer, pockets are formed therein to receive the balls 5. The bottoms of these pockets are on a radius conforming to, but somewhat greater than, the curvature of the balls. The sides are tangent to the radius in a vertical plane, so that the balls may be readily inserted in the pockets. The depth of these pockets is greater than the radius of the balls, the thickness of the material below the pockets being approximately .080". The pockets are substantially U-shaped cavities open at the top and on the sides facing the inner and outer race.

Between the pockets V-shaped radial grooves 8 are formed in the retainer 3. As best shown in Figs. 4 and 5, the bottom 9 of each groove slopes at an angle of approximately 20° to the horizontal away from the ring center, and the sides form an included angle of 60°.

The material between a groove 8 and the adjacent ball pockets may be forced towards the balls to form a radius conforming to that of the pockets. As best shown in Figs. 1 and 3, when so formed the sides of this material constitute ball retaining lugs having parallel sides. The greatest depth of these grooves 8 is .090" so that enough material is left between the bottom of the groove and the bottom of the retainer to prevent breaking off of these lugs during the forming operation.

Fig. 6 illustrates a tool by means of which the assembly of the retainer may be completed. It consists of a punch 10 and a pad 11 between which are placed the various elements of the ball bearing. The punch 10 is hollowed out at its center as indicated at 14 to accommodate the cone 2. Projections 12 in pad 11 engage the grooves 8 in the retainer and the balls 4 are accommodated within the hollows 13 between projections 12. Depending on the length of the stroke of punch 10, the projections 12 penetrate to a certain distance within grooves 8 forcing the material between the grooves and the ball pockets towards the balls. Owing to the shape of the grooves 8 and the slope of the projections 12, the lugs between the grooves and the pockets are formed to a radius conforming to that of the ball pocket. The depth of the pockets being greater than the radius of the balls, the latter will be prevented from falling out of the pocket.

It will be obvious to those skilled in the art that the exemplification herein disclosed may be modified and adapted for various uses without departing from the spirit of the invention.

What I claim is:

1. In a ball bearing, an inner race, an outer race spaced therefrom, a ball retainer between the races consisting of a substantially ring-shaped self-lubricating composition of substantially the same thickness as the width of the space between the races, said retainer having pockets formed in one face to receive the balls, the depth of said pockets being greater than the radius of the balls, and grooves between the pockets, the bottom of each groove slanting at an angle to the horizontal, the material left between the grooves and the pockets being formed to a radius conforming to that of the ball pocket.

2. In a ball bearing, an inner race, an outer race spaced therefrom, a ball retainer between the races consisting of a substantially ring-shaped self-lubricating composition of substantially the same thickness as the width of the space between the races, said retainer having ball pockets open on the sides and top, the depth of said pockets being greater than the radius of the balls, and radial grooves of V-shaped cross-section between the pockets extending the full width of the retainer but shallower than said pockets, the bottom of each groove slanting from the ring center at an angle of approximately 20° to the horizontal, the material left between the grooves and the pockets being formed to a radius conforming to that of the ball pocket and having substantially parallel edges.

WILLIAM F. SMITH.